United States Patent [19]

Coutant

[11] 3,988,045

[45] Oct. 26, 1976

[54] IMPACT ABSORBING IDLER ROLL ASSEMBLY

[75] Inventor: Ralph W. Coutant, Ho-Ho-Kus, N.J.

[73] Assignee: Litton Systems, Inc., Passaic, N.J.

[22] Filed: May 7, 1975

[21] Appl. No.: 575,259

[52] U.S. Cl. .................................. 308/20; 29/125; 198/780
[51] Int. Cl.² ......................................... F16C 13/00
[58] Field of Search....... 308/20; 198/192 R, 192 A; 193/37; 29/110, 124, 125, 130

[56] References Cited
UNITED STATES PATENTS

| | | | |
|---|---|---|---|
| 2,596,499 | 5/1952 | Mercier | 198/192 R X |
| 3,182,378 | 5/1965 | Shorner | 29/125 |

*Primary Examiner*—M. H. Wood, Jr.
*Assistant Examiner*—Gene A. Church

[57] ABSTRACT

An impact absorbing for an idler assembly is formed from a series of molded discs of synthetic material such as polyurethane or the like having a thickened hub with a non-circular central aperture that extends axially through the disc and permits the disc to be press-fitted onto a tube shell whose exterior configuration assumes a similar non-circular form. The dimensions of the central aperture in each disc are slightly less than the corresponding axial dimensions of the tube shell, so that the inherent resilence of each disc holds same securely upon the shell in a slip-free relationship; the preferred, commercially readily available non-circular shape is a a rectangle.

The hub on each disc contacts the hub on the adjacent disc, so that the discs are retained in alignment with one another and tend to rotate as a unit. A metal reinforcing ring may be molded within the disc, if needed, to enhance its structural rigidity and further increase its ability to absorb impact forces. The ring circumscribes the tube shell, and portions of the ring are exposed through each disc so that metal-to metal contact is established at each corner of the polygonal, non-circular tube shell.

20 Claims, 4 Drawing Figures

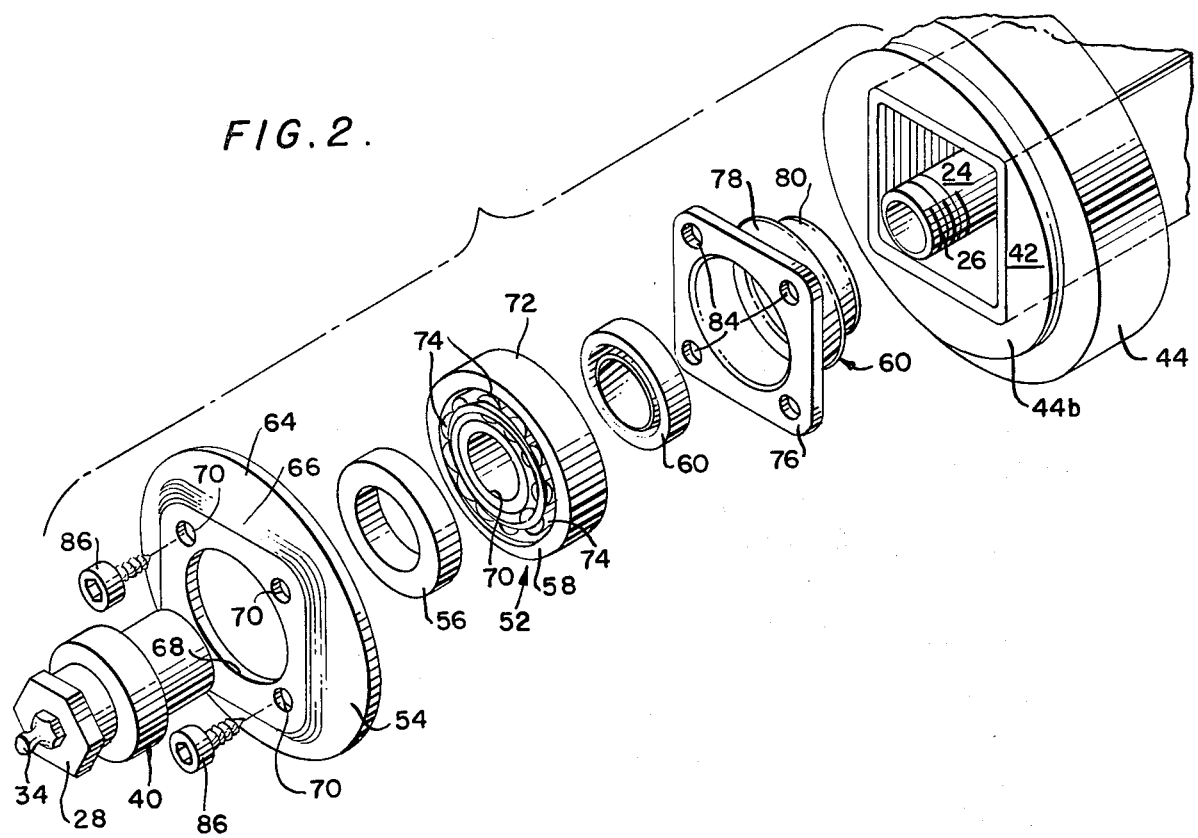
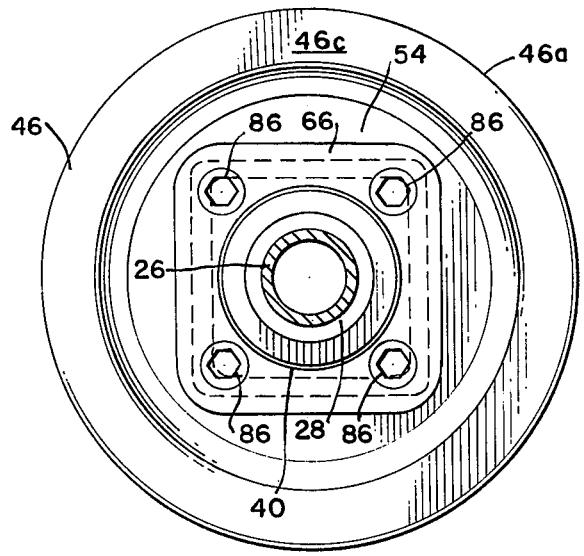
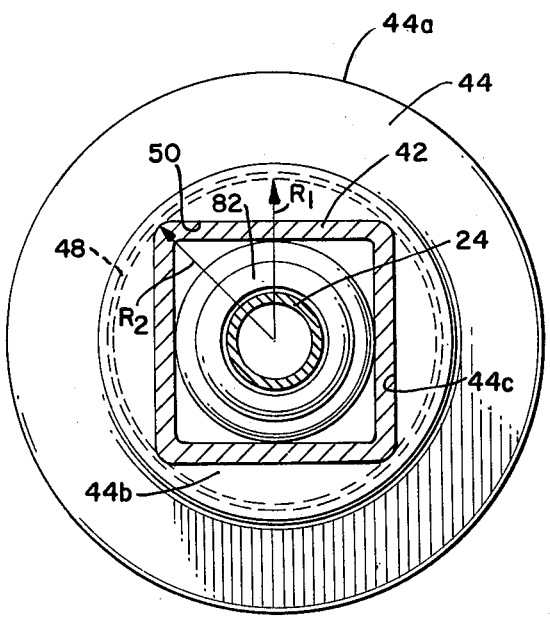

IMPACT ABSORBING IDLER ROLL ASSEMBLY

BACKGROUND OF THE INVENTION

1. Field of the Invention

The instant invention relates generally to idler roll assemblies for absorbing the impact forces imposed thereupon by the dumping of loads of stone, coal, ore or the like upon the upper run of an endless conveyor belt entrained over the idler roll assemblies.

2. Prior Art

The desirability of providing a longlived, yet inexpensive impact absorbing idler roll assembly that (1) is positively secured to a central support shaft in a wobble-free manner, and (2) maintains maximum contact with the belt to prevent localized sagging has long been recognized within the conveyor industry. Similarly, the desirability of providing a shock absorbing idler roll that (3) is sufficiently sturdy and abrasion resistant to withstand the repeated application of heavy loads, yet resilient enough to yield momentarily and return to its unstressed configuration promptly, while (4) maintaining axial alignment between adjacent discs, has long been recognized. Numerous attempts have been made to attain all four of these desirable criteria in a preferred idler roll assembly configuration, but, to date, no assembly has fully satisfied every criteria.

To illustrate, U.S. Pat. No. 2,596,499, granted May 13, 1952 to S. M. Mercier, discloses an impact absorbing idler roll assembly comprised of a plurality of readily resilient tires, or discs, stacked on a tubular shell. An annular opening is formed in the hub of each tire so that the tire may be seated on a cylindrical shaft extending axially through the roll. Projections on one side of each tire engage recesses on the opposite side of the adjacent tire so that the tires can be interlocked with one another.

U.S. Pat. No. 2,632,560, granted Mar. 24, 1953 to F. J. Wright, discloses an impact absorbing idler roll assembly comprised of a plurality of tires, each tire or disc having a tubular hub sleeve that enables it to be mounted upon an axially extending tubular support hub. Each tire has a tapered resilient body portion whose axial dimension is greatest adjacent to the tubular support hub, and a substantially non-deformable rim is joined to the periphery of each tire. A tie rod extends through the tubular support hub, and nuts on the opposite ends of the rod are tightened to hold the asssembly in alignment.

U.S. Pat. No. 3,310,160, granted Mar. 21, 1967 to D. C. Reilly, discloses an impact absorbing idler roll assembly comprised of a plurality of tires, or discs, secured upon a cylindrical shell that can rotate relative to a cylindrical shaft disposed within the shell. Each tire includes a hub with an annular opening that slips onto the hollow cylindrical shell for rotation about a fixed central shaft, a resilient tube body, and a tread that extends about the circumference of the tire. Axially extending jaw teeth are formed on the hub of each tire, so that the teeth of adjacent tires can be interlocked and the tires can rotate as a unit. Retaining rings with radially extending setscrews are employed at opposite ends of the roller so that the tires are retained in the desired axial alignment upon the hollow cylindrical shell.

However, each of the three illustrative impact absorbing idler roll assemblies noted above, failed to satisfy one or more of the criteria for optimum efficiency previously set forth. Perhaps, the most significant shortcoming encountered with all three of the illustrative assemblies was angular slippage of the tires or discs relative to the support shaft upon which are mounted; this shortcoming was attributable to the ease with which the annular hub of the disc rode along the cylindrical surface of the support shaft. Such slippage lead to increased wear on the bearings of the idler assembly with the potential attendant generation of internal heat and friction; also, since certain tires or discs rotated easily while others did not, localized shearing forces were produced that adversely affected the conveyor belt passing over the idler roll assembly.

Also, the use of several distinct materials in the fabrication of the impact absorbing idler roll assembly proposed in the Wright patent could introduce an undersirable cost factor into the total production costs for such assembly. Furthermore, the use of tires having rims that are much thinner than their hubs allows relatively wide expanses of the belt to be unsupported; consequently, the belt will tend to sag and wear unevenly.

SUMMARY

Thus, with the deficiencies of the prior art impact absorbing idler roll assemblies clearly in mind, the instant invention comtemplates an impact absorbing idler roll assembly comprising a plurality of resilient discs mounted upon a tube shell that is non-circular, when viewed in end elevation. Such shaft, in turn, is joined by an adapter mechanism to an axially extending cylindrical shaft passing axially through an idler roll. The instant invention further comtemplates discs that will be integrally molded from a resilient, abrasion-resistent material, with a hub having an axially extending aperture that is of the same non-circular configuration and slightly smaller in size than the outer dimensions of the tube shell upon which the discs are to be mounted; the discs will be retained in fixed position on the shell and will tend to rotate as a unit with the shell. Also, the instant invention contemplates a series of discs formed of the same material throughout, with relatively broad tread surfaces for supporting the conveyor belt in a sagfree manner. In selecting the material for the discs, polyurethane was found to be most desirable, for the molding of such discs can be achieved with uniform weight distribution throughout, and the discs are able to quickly return to their normal concentricity even after repeated severe impact shocks.

Other significant advantages attributable to the instant impact absorbing idler roll assembly will become readily apparent to the skilled artisan when the following detailed description of the invention is construed in harmony with the appended drawings.

BRIEF DESCRIPTION OF THE DRAWINGS

FIG. 2 is an exploded perspective view of the adapter mechanism for joining the rectangular tube shell which supports the plurality of discs to the cylindrical shaft extending through the wing roll;

FIG. 3 is a side elevational view of the outermost disc of the idler roll assembly; such view being taken along line 3—3 in FIG. 1 and in the direction indicated; and FIG. 4 is a side elevational view of an intermediate disc of the impact absorbing idler roll assembly, such view being taken along line 4—4 in FIG. 1 and in the direction indicated.

DESCRIPTION OF THE INVENTION

Figure 1:
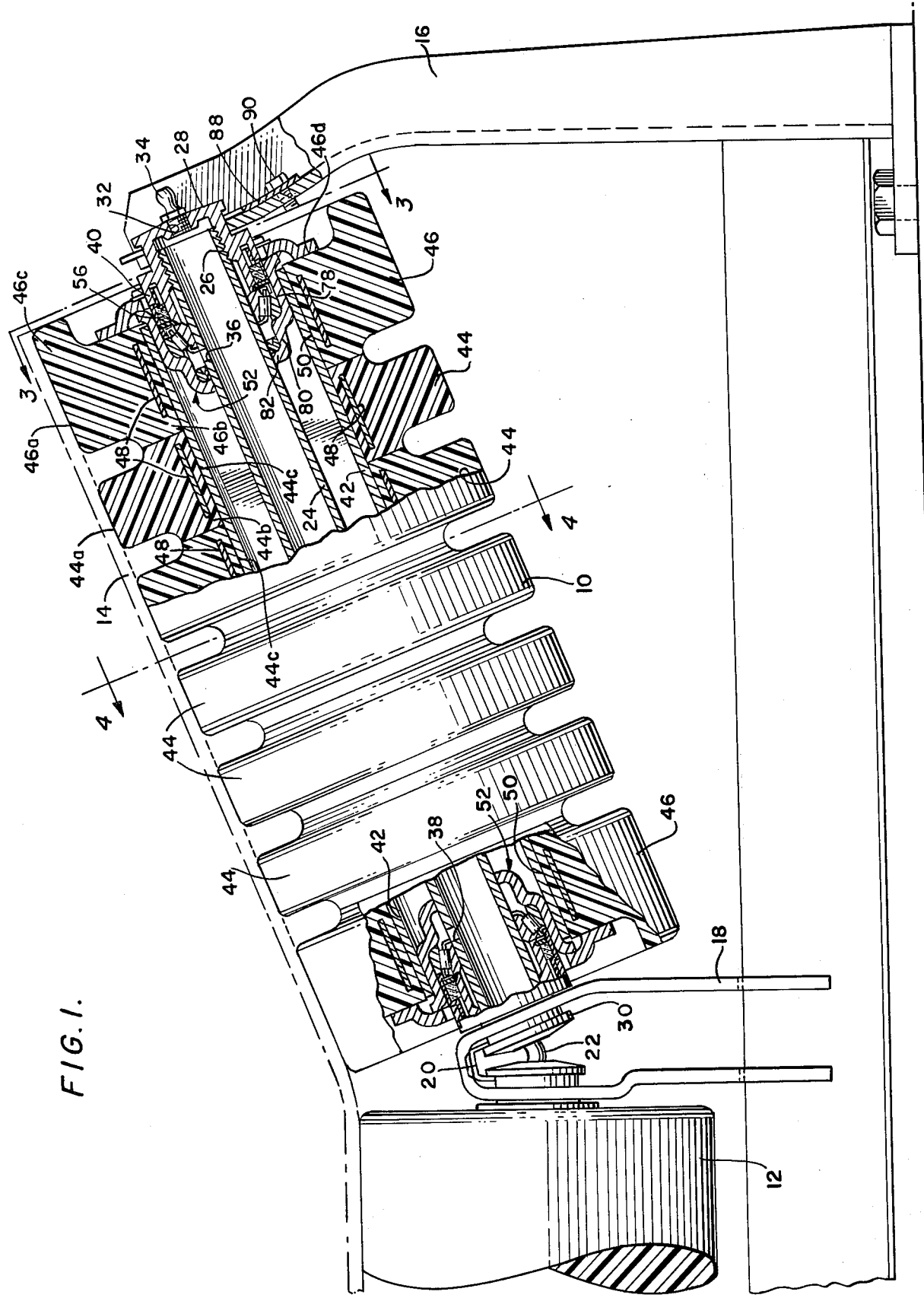
FIG. 1 is a front elevational view of a fragment of a center roll and a wing roll of an impact absorbing idler roll assembly, constructed in accordance with the principles of the instant invention, portions of the wing roll being cut away for the sake of clarity.

Referring now to the drawings wherein like reference numerals identify like structural components, FIG. 1 shows a wing roll 10 and a fragment of a center roll 12 of an impact absorbing idler roll assembly. A fragment of the upper run of a conveyor belt 14 is shown entrained over rolls 10 and 12. Due to the angular orientation of roll 10 relative to roll 12, and the same angular orientation of the opposite wing roll (not shown) relative to roll 10, a trough is defined in the belt 14 for transporting material deposited thereon.

The outer end of roll 10 is retained in an opening in the end bracket 16 while the inner end of roll 10 is retained in an opening in one leg of interior bracket 18. One end of the roll 12 is retained in an opening in the other leg of interior bracket 18, and a keeper 20 presses against the rolls and holds same in fixed position. A lubrication tube 22 extends between the adjacent rolls. It will be appreciated that the left-hand end of the impact absorbing idler roll assembly is substantially a mirror image of the right-hand end, and that further illustration and description would be superfluous.

Lubrication tube 22 establishes communication between the central cylindrical shaft 24 which extends axially through roll 10 and an identical shaft (not shown) which extends axially through roll 12. Shaft 24 has external thread 26 at opposite ends thereof, and a first end cap 28 is secured to one end thereof and a second end cap 30 is secured to the opposite end. End cap 28 has an axial passageway 32 with a grease fitting 34 secured therein while end cap 30 has a similar axial passageway with lubrication tube 22 secured therein. A first radial port 36 is defined through shaft 24 near end cap 30. End cap 28 includes a radially offset, annular skirt 40; end cap 30 has a similar skirt (not shown).

A substantially rectangular tube shell 42 is located about shaft 24, and in axial alignment therewith. A plurality of molded polyurethane discs 44, 46 are secured upon tube shell 42; while all of the intermediate discs 44 are identical in size, shape and function, slightly different end discs 46 are used at the remote ends of tube shell 42. If desired, however, a plurality of identical discs 44 could be employed exclusively and the end discs 46 could be omitted.

Each disc 44 comprises a body with a relatively broad tread portion 44a that supports conveyor belt 14, and a thickened hub 44b that extends axially beyond the tread portion on both sides of the disc. An aperture 44c of substantially rectangular configuration extends axially through hub 44b. An annular metal band 48 is situated within hub 44b to increase the ability of each disc to resist the shearing forces generated when heavy loads tend to rotate the disc relative to shell 42. The radius $R_1$ of band 48 is slightly greater than the radial distance $R_2$ from the midpoint of shaft 24, as shown in FIG. 4, so that, in effect, band 48 circumscribes tube shell 42. Minor segments of band 48 are exposed at the corners of axially extending aperture 44c so that four spaced areas of metal-to-metal contact are produced between band 48 and tube shell 42.

Discs 44, 46 are molded of polyurethane or similar resilient, sturdy, abrasion-resistant uniform density plastic. As previously noted, the dimensions of the aperture 44c are selected to be just slightly smaller than the dimensions of the tube shell 42 upon which the discs 44, 46 are to be seated. Discs 44, 46 may just as easily be formed from rubber or like materials.

Discs 44, 46 are forced axially onto the tube shell 42 with several hundred pounds of pressure; the walls defining apertures 44c within the discs are momentarily deformed outwardly during the seating process. However, once the axially applied pressure is removed from the discs, the inherent resiliency of the discs produces radially directed tensile forces that retain the discs securely joined to the shell. Consequently, when rotative forces are applied to the discs, the plurality discs and the tube shell rotate, without slippage, as a unitary member. Also, the hubs 44b of adjacent discs are pressed against each other to produce frictional forces therebetween, as well as to properly align the discs along the axial dimension of the tube shell 42.

Each end disc 46 has a body including tread 46a and a thickened hub 46b. The tread, as best seen at the right hand end of roll 10 in FIG. 1, extends axially beyond the major portion of the body of the disc to form ledge 46c, and hub 46b extends axially away from the major portion of the body of the disc on the side opposite to the ledge. The ledge 46c extends annularly about one face of the disc, and defines a cavity 46d within the side wall of the end disc 46. An axially extending rectangular aperture 50, which is identical to the aperture 44c defined through the hub of each intermediate disc 44, extends axially through hub 46b of each end disc 46.

The adapter mechanism 52 that enables rectangular tube shell 42 to rotate relative to cylindrical shaft 24 is shown in assembled condition in FIG. 1 and in unassembled condition in the exploded perspective of FIG. 2. Adapter mechanism 52 includes a disc keeper 54, an annular dust seal 56, a roller bearing cartridge 58, a back seal 60, and a stepped adapter cup 62.

The disc keeper 54 is an annular plate 64 with a slightly concave central segment 66. An annular opening 68 extends through segment 66, and several small holes 70 are formed near the corners of segment 66. All of the holes are located the same radial distance from the center of annular opening 68, and the diameter of opening 68 is sufficient to allow skirt 40 of end cap 28 to pass freely therethrough.

The dust seal 56 is an annular member whose inner diameter is slightly greater than the outer diameter of the cylindrical body of end cap 28. Hence, the dust seal 56 can be forced onto the end cap at a location in proximity to the lower edge of skirt 40. The roller bearing cartridge 58 includes an annular inner raceway 70, an annular outer raceway 72, and a plurality of tapered bearings 74 retained in a cage defined therebetween to facilitate relatively frictionless rotational movement. A back seal 60 is disposed adjacent to the roller bearing cartridge 58, and the inner diameter of the seal 60 is selected to be slightly greater than that of shaft 24 so that the seal can be forced onto the shaft, and retained thereon, at a location adjacent to radial port 36.

The stepped adapter cup 60 comprises a flat mounting plate 76, a first tubular segment 78, a second tubular segment 80, and an annular opening defined by lip 82. The inner diameter of the opening in cup 60 is slightly greater than the outer diameter of shaft 24, so that the cup can be positioned upon the shaft. The outer diameter of the first tubular segment 78 is slightly less than the internal diagonal dimension of rectangular tube shell 42 so that stepped cup 60 can be inserted thereinto. The diameter and axial length of first tubular segment 78 are greater than the diameter and axial length of second tubular segment 80. Adapter cap 60 is secured by welding or other suitable means to tube shell 42.

A plurality of holes 84 are formed as spaced locations in mounting plate 76; the holes are spaced equidistant from the midpoint of the plate and in alignment with openings 70 in disc keeper 54.

The manner of assembling the various components of the impact absorbing idler roll assembly is described with particular reference to FIG. 2. First, the discs 44, 46 are positioned so that rectangular openings 50 are in alignment with rectangular tube shell 42 and then the discs are forced axially into the tube shell by the application of several hundred pounds of force. The discs, particularly in the thickened hub area, are momentarily deformed as they are positioned on the tube shell; however, once the pressure is released, the inherent resilence of the discs causes them to firmly grasp the tube shell 42. The gripping power of the discs is greatly enhanced by forming the interior dimensions of the rectangular aperture 50 in each disc slightly smaller than the exterior dimensions of the tube shell 42 so that the disc exerts a constant, radially directed tensile force upon the shell. Also, the presence of the metal band 48 in the corners of the rectangular aperture 50 in each disc metal-to-metal contact and, in effect, keys each disc and the tube shell together. The hubs of the adjacent discs maintain the desired axial alignment along shell 42. After the discs 44, 46 are secured to the tube shell 42, the shell is slipped over shaft 24. Alternatively, the shaft 24 can be inserted into tube shell 42, and the discs 44, 46 can be forced onto the tube shell after the tube shell has been positioned relative to shaft 24.

The stepped adapter cup 60 is secured, as mentioned into the interior of tube shell 42 so that the rear face of plate 76 abuts against the edge of the shell while lip 82 is diposed adjacent to radial port 36 in shaft 24. Back seal 60 may be slipped over shaft 24 until it is seated against lip 82, and bearing cartridge 58 is slipped over shaft 24 until the inner edge of the cartridge is seated against the shoulder defined between tubular segments 78 and 80. The dust seal 56 is then slipped over the shaft 24 until it abuts against the front edge of the roller bearing cartridge 58. Disc keeper 54 is then secured to plate 76 of adapter cup 60 by advancing self-tapping screws 86 through aligned holes 70 and 84. The screws, when fully advanced, join disc keeper 54 to adapter cup 60 and maintain seals 56 and 60, and roller bearing cartridge 58, in fixed position. To complete the assembly, end cap 28 is advanced onto the screw threads 26 formed at the ends of shaft 24 and retainer 88 is joined to end bracket 16 by screw 90. Disc keeper 54 fits within the concavity defined in the side face of end disc 46.

FIG. 3 more fully shows the spatial relationship among the end cap 28 screwed onto shaft 26, the end disc keeper 54, the self-tapping screws 86, and the end disc 46. FIG. 4 shows, in a similar vertical cross-sectional view, the spatial relationship among shaft 26, tube shell 42, and each intermediate disc 44.

The instant impact absorbing idler roll assembly, when fully installed, serves to support conveyor belts 14 in a sag-free manner across treads 44a, 46a. When heavy loads, such as ore, coal or particulate materials are deposited on top of belt 14, the bulk of the impact forces are absorbed by the plurality of resilient discs 44, 46 secured upon tube shell 42 as the discs are momentarily deformed. The discs quickly return to their normal undeformed condition, and the discs, because of the tensile forces they exert upon tube shell 42, move as a unit with the tube shell as the shell and discs rotate relative to fixed shaft 24. The lubrication for minimizing the friction within the bearing cartridge 58 disposed at the opposite ends of shaft 24 is introduced, under pressure, through grease fitting 34 and passes through radial ports 36, 38 to lubricate the roller bearings. Lubrication tube 22 leads the lubricant from the hollow shaft 24 for roll 10 to the hollow shaft for central roll 12. Back seals, such as seal 62, prevent the lubrication from leaking out of the adapter cups 60. Dust seal 56, skirt 40 on end cap 28, and disc keeper 54 prevent dust from entering the adapter cup and interfering with the smooth operation of rollers 74.

The skilled artisan will readily realize that various changes can be made in the preferred embodiment of an impact absorbing idler assembly without departing from the inventive spirit of the instant invention. For example, the annular metal band 48 that passes through the hub of each disc 44, 46 may be omitted, particularly under less severe loading conditions. Although polyurethane has proven in practive to be the most desirable material from which to mold the discs, other plastic materials, as well as natural synthetic rubbers and combinations thereof, could be used provided that the alternative material selected was easily molded, sturdy, resistant to corrosion, and not tacky at ambient temperatures and pressures. Furthermore, the aperture in the hub of discs 44, 46 need not be rectangular in shape, although such configuration has proven to be most satisfactory under experimental test conditions; however, the aperture, and the slightly smaller tube shell, could assume any other non-circular shape when viewed in end elevation.

Theoretically, at least, comparable effectiveness could be achieved by the use of triangular, pentagonal, hexagonal, septagonal, octagonal, etc. apertures and shells. The term non-circular connotates that a circle, which, in plane geometry is a polygon with an infinite number of sides, would not be an acceptable shape, for, as experienced with conventional idler roll assemblies, the discs with circular apertures tend to slip along a shaft with a circular outline in end elevation.

In the same manner "non-circular" is also intended to include non-polygonal configurations as long as the ability of the disc to slip around the shaft is prevented. Thus a gear shaped configuration, or that of an X or cross (+) would also suffice; it being understood that the arms, or legs of the cross-section selected be of sufficient dimension to accomplish the desired end.

Regardless of the shape selected for the aperture and the tube shell, the metal band in the hub of each disc would be exposed at spaced intervals corresponding to the corners of the tube shell. Thus, if a triangular tube shell were employed, the metal band be exposed at each of the three corners for optimum efficiency.

Manifestly, in view of the numerous modifications, changes and alterations suggested above, the appended claims should not be limited to their literal terms, but should be broadly construed in a manner consistent with the significant contribution to the useful arts and sciences realized by the instant invention.

We claim:

1. An impact absorbing idler roll assembly for supporting a conveyor belt, comprising, in combination;
   a. an axially extending shaft that is circular when viewed in end elevation,
   b. a tube shell positioned about said shaft and extending in the same axial direction,
   c. said shell being but non-circular, when viewed in end elevation,
   d. a plurality of resilient, abrasion and corrosion resistant discs, each disc comprising a body with a circumferential tread to support the conveyor belt and a thickened hub,
   e. an aperture extending axially through each disc, said aperture being non-circular when viewed in end elevation,
   f. said discs being retained upon said shell in slip-free relationship by the inherent resiliency of each disc, and
   g. adapter means, including bearing means, situated between said shell and said shaft so that said shell and said discs can rotate in unison relative to said shaft when impact forces strike the discs.

2. The idler roll assembly as defined in claim 1 wherein an annular metal band is situated within each disc, said band enhancing the structural integrity of the disc.

3. The idler roll assembly as defined in claim 1 wherein said polygonal, non-circular tube shell and said form of a non-circular aperture in each disc; are polygonal.

4. The idler roll assembly as defined in claim 3 wherein the dimensions of the aperture in each disc are slightly smaller than the exterior dimensions of said tube shell, whereby said discs are force-fitted onto said tube shell by an axially applied thrust.

5. The idler roll assembly as defined in claim 4 wherein the discs are fabricated from an inherently resilient plastic material, so that after being force-fitted onto said tube shell, the discs are securely retained thereon by radially directed tensile forces.

6. The idler roll assembly as defined in claim 2 wherein the radial distance from the midpoint of the cylindrical shaft to said metal band is slightly larger than the greatest radial distance from the midpoint of the cylindrical shaft to the outer surface of said tube shell, whereby said metal band circumscribes said tube shell.

7. The idler roll assembly as defined in claim 6 wherein said band makes contact with said tube shell at several spaced points corresponding to the corners of the polygonal, but non-circular, tube shell to resist the shearing forces generated between each disc and said shell.

8. The idler roll assembly as defined in claim 1 wherein said adapter means comprises a disc keeper, a plurality of seals and an adapter cup, said keeper and said cup being joined together by fastening means so that said roller means and said plurality of seals are maintained in proper alignment.

9. The idler roll assembly as defined in claim 8 wherein said adapter cup comprises a flat mounting plate, a first larger tubular segment and a second smaller tubular segment for receiving said seals and said roller means therewithin, and an annular opening defined by an inturned lip, the diameter of the annular opening being greater than the diameter of said shaft so that said adapter cup can be positioned thereon.

10. The idler roll assembly as defined in claim 8 wherein said fastening means comprise self-threading screws.

11. An impact absorbing disc for disposition about a tube shell supporting a belt conveyor comprising;
    a. an abrasion resistant, resilient body with a circumferential tread surface and a thickened central hub,
    b. a non-circular, aperture extending axially through said hub, and
    c. said body being molded as a unitary member from a resilient plastic material that permits said aperture to be temporarily enlarged to enable said disc to be secured onto a tube shell with an axial length that has a similar non-circular, exterior configuration when viewed in end elevation, 12. An impact absorbing disc as defined in claim 11 wherein an annular metal band is located within said hub to enhance the strength of said disc.

13. An impact absorbing disc as defined in claim 12 wherein a small segment of said annular band is exposed at each corner of the non-circular, aperture in each disc.

14. An impact absorbing disc as defined in claim 11 wherein the resilient plastic material is polyurethane.

15. A method of joining discs to a supporting member in a slip-free relationship, such member being non-circular; when viewed in end elevation, comprising the steps of:
    a. selecting a readily moldable material that is resilient, abrasion resistant and non-tacky at ambient temperature,
    b. molding a disc from the selected material having a body with a circumferential tread, a thickened hub, and a non-circular aperture extending axially through the hub,
    c. forming the aperture in the disc to be slightly smaller than the external dimensions of the support member,
    d. forcing said disc in an axial direction onto thrust to momentarily enlarge the aperture in the disc, and
    e. terminating the axial thrust so that the disc will relax and the inherent resilience of the disc exerts radially directed tensile forces upon the support member for firmly locking the disc to the support member said support member with sufficient axial.

16. The method of claim 15 further including the step of:
    f. positioning an annular metal band within the hub of the disc in proximity to the aperture prior to molding the disc.

17. The method of claim 16 further including the step of:
    g. exposing a small segment of the metal band in each corner of the non-circular aperture.

18. A method of assembling an impact roller assembly comprising the steps of:
    a. selecting a readily moldable material that is resilient, abrasion resistant, and non-tacky at ambient temperature,
    b. molding a plurality of discs from the selected material, each disc having a body with a circumferential tread and a thickened hub, and a polygonal, non-circular aperture extending axially therethrough,
    c. positioning a polygonal, non-circular hollow tube shell with its lengthwise dimension extending in an axial direction.

d. forming the aperture in each disc to be slightly smaller than the external dimension of the tube shell,
e. forcing each disc in an axial direction onto the tube shell with sufficient axial thrust that the aperture in each disc is momentarily enlarged,
f. terminating the axial thrust to enable each disc to relax so that the inherent resilience of the disc exerts radially directed tensile forces upon the tube shell for firmly locking each disc to the tube shell,
g. inserting a cylindrical shaft axially through the hollow interior of the tube shell,
h. slipping adapter cups over the opposite ends of the shaft, and
i. inserting roller bearings into each adapter cup so that the tube shell with the discs locked thereto can rotate relative to the cylindrical shaft.

19. The method as defined in claim 18 further including the steps of:
j. positioning an annular metal band within the hub of each disc in proximity to the aperture prior to molding the disc, and
k. exposing a small segment of the metal band in each corner of the polygonal, non-circular aperture.

20. The method as defined in claim 18 further including the steps of:
l. inserting a plurality of seals into each adapter cup,
m. positioning a disc keeper in abutting relationship to each adapter cup with the seals and rollers bearings disposed therebetween, and
n. passing fastening means through the disc keeper and the adapter cup to join them together.

* * * * *